United States Patent
Jeong et al.

(10) Patent No.: US 8,050,509 B2
(45) Date of Patent: Nov. 1, 2011

(54) METHOD OF AND APPARATUS FOR ELIMINATING IMAGE NOISE

(75) Inventors: Young-hoon Jeong, Suwon-si (KR); Won-kyu Hwang, Suwon-si (KR); Keum-seok Lee, Yongin-si (KR); Ju-hee Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1068 days.

(21) Appl. No.: 11/863,393

(22) Filed: Sep. 28, 2007

(65) Prior Publication Data

US 2008/0118179 A1    May 22, 2008

(30) Foreign Application Priority Data

Nov. 21, 2006   (KR) .................. 10-2006-0115422

(51) Int. Cl.
*G06K 9/40* (2006.01)
*G06K 9/38* (2006.01)

(52) U.S. Cl. ........ 382/261; 382/254; 382/260; 382/263; 382/264; 382/266; 382/272; 382/274; 382/275

(58) Field of Classification Search .................. 382/261, 382/254, 260, 263, 264, 266, 272, 274, 275; 358/463
See application file for complete search history.

(56) References Cited

U.S. PATENT DOCUMENTS

| | | | | |
|---|---|---|---|---|
| 6,055,340 A * | 4/2000 | Nagao | | 382/261 |
| 6,175,657 B1 * | 1/2001 | Mancuso et al. | | 382/261 |
| 6,295,382 B1 * | 9/2001 | Karanovic | | 382/261 |
| 6,373,992 B1 * | 4/2002 | Nagao | | 382/266 |
| 6,999,634 B2 * | 2/2006 | Hong | | 382/275 |
| 7,373,013 B2 * | 5/2008 | Anderson | | 382/261 |
| 7,724,979 B2 * | 5/2010 | Drezner et al. | | 382/261 |
| 7,769,089 B1 * | 8/2010 | Chou | | 375/240.29 |
| 7,792,384 B2 * | 9/2010 | Gomi et al. | | 382/266 |
| 2002/0150302 A1 * | 10/2002 | McCarthy et al. | | 382/254 |
| 2003/0189655 A1 * | 10/2003 | Lim et al. | | 348/241 |
| 2004/0230802 A1 * | 11/2004 | Moon | | 713/176 |
| 2005/0128355 A1 * | 6/2005 | Kang et al. | | 348/606 |
| 2005/0231603 A1 * | 10/2005 | Poon | | 348/208.99 |
| 2006/0262196 A1 * | 11/2006 | Hasegawa et al. | | 348/223.1 |

FOREIGN PATENT DOCUMENTS

| | | |
|---|---|---|
| KR | 10-0327385 B1 | 2/2002 |
| KR | 10-2003-002608 A | 1/2003 |

OTHER PUBLICATIONS

Schoonenberg, et al. "Adaptive spatial-temporal filtering applied to x-ray fluoroscopy angiography." Proce. of SPIE, Medical Imaging 2005: Visualization, Image-Guided Procedures and Display. 5744. (2005): 870-878. Print.*

* cited by examiner

*Primary Examiner* — Matthew Bella
*Assistant Examiner* — Michael A Newman
(74) *Attorney, Agent, or Firm* — Sughrue Mion, PLLC (57) ABSTRACT

A method and apparatus are provided for eliminating image noise to remove spatial-temporal noise and improve visibility. The method includes extracting a spatial-temporal noise level of neighbor pixels around a current pixel, filtering noise of the current pixel by applying a weight to spatial-temporal pixels around the current pixel based on the extracted spatial-temporal noise level, and applying a weight to the noise-filtered pixel and a boosted-up pixel based on an edge intensity and summing the weight-applied pixels. The spatial-temporal noise level is extracted based on spatial-temporal information of neighbor pixels around a current pixel in a current frame and spatial-temporal information of neighbor pixels around a current pixel in a previous frame.

20 Claims, 5 Drawing Sheets

METHOD OF AND APPARATUS FOR ELIMINATING IMAGE NOISE

CROSS-REFERENCE TO RELATED PATENT APPLICATION

This application claims priority from Korean Patent Application No. 10-2006-0115422, filed on Nov. 21, 2006 in the Korean Intellectual Property Office, the disclosure of which is incorporated herein in its entirety by reference.

BACKGROUND OF THE INVENTION

1. Field of the Invention

Methods and apparatuses consistent with the present invention relate to image processing, and more particularly, to eliminating image noise to remove spatial-temporal noise and improve visibility.

2. Description of the Related Art

In general, noise is inevitably added to a television (TV) image signal captured by a camera and transmitted over a channel during the capturing and the transmission. The noise degrades the quality of an image provided to a viewer and affects adversely image signal processing aiming to provide a high-quality image.

A method for eliminating such noise can be classified into a spatial noise elimination algorithm and a temporal noise elimination algorithm.

Because of using the stationary model of an image, the spatial noise elimination algorithm cannot preserve contours in a noise-eliminated image. A contour region spatially has high-frequency components. As a result, when the spatial noise elimination algorithm performs filtering to eliminate high-frequency noise, contours may be damaged during the elimination of the high-frequency noise, blurring details.

The temporal noise elimination algorithm temporally recognizes the characteristics of noise using image signals of a plurality of frames or separates noise from image signals using a change in the shape of an object or a temporal change in the image signals. In spite of its superiority in performance over the spatial noise elimination algorithm, the temporal noise elimination algorithm requires a large amount of computation in hardware and software implementation.

SUMMARY OF THE INVENTION

The present invention provides a method of and apparatus for eliminating image noise to eliminate image noise and improve visibility by considering a spatial edge component, a temporal correlation, and spatial-temporal brightness.

According to one aspect of the present invention, there is provided a method of eliminating image noise. The method includes extracting a spatial-temporal noise level of neighbor pixels around a current pixel, filtering noise of the current pixel by applying a weight to spatial-temporal pixels around the current pixel based on the extracted spatial-temporal noise level, and applying a weight to the noise-filtered pixel and a boosted-up pixel based on an edge intensity and summing up the weight-applied pixels.

According to another aspect of the present invention, there is provided an image processing apparatus including a noise level extraction unit, a spatial-temporal noise elimination unit, and an edge improvement unit. The noise level extraction unit extracts a spatial-temporal noise level of neighbor pixels around a pixel based on spatial-temporal information of neighbor pixels around a pixel in a current frame and spatial-temporal information of neighbor pixels around a current pixel in previous frames. The spatial-temporal noise elimination unit filters noise of the current pixel by applying a weight to spatial-temporal pixels around the current pixel based on the spatial-temporal noise level extracted by the noise level extraction unit. The edge improvement unit applies a weight to the noise-filtered pixel obtained by the spatial-temporal noise elimination unit and a boosted-up pixel based on an edge intensity and sums up the weight-applied pixels.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS

Hereinafter, exemplary embodiments of the present invention will be described in detail with reference to the accompanying drawings.

Figure 1:
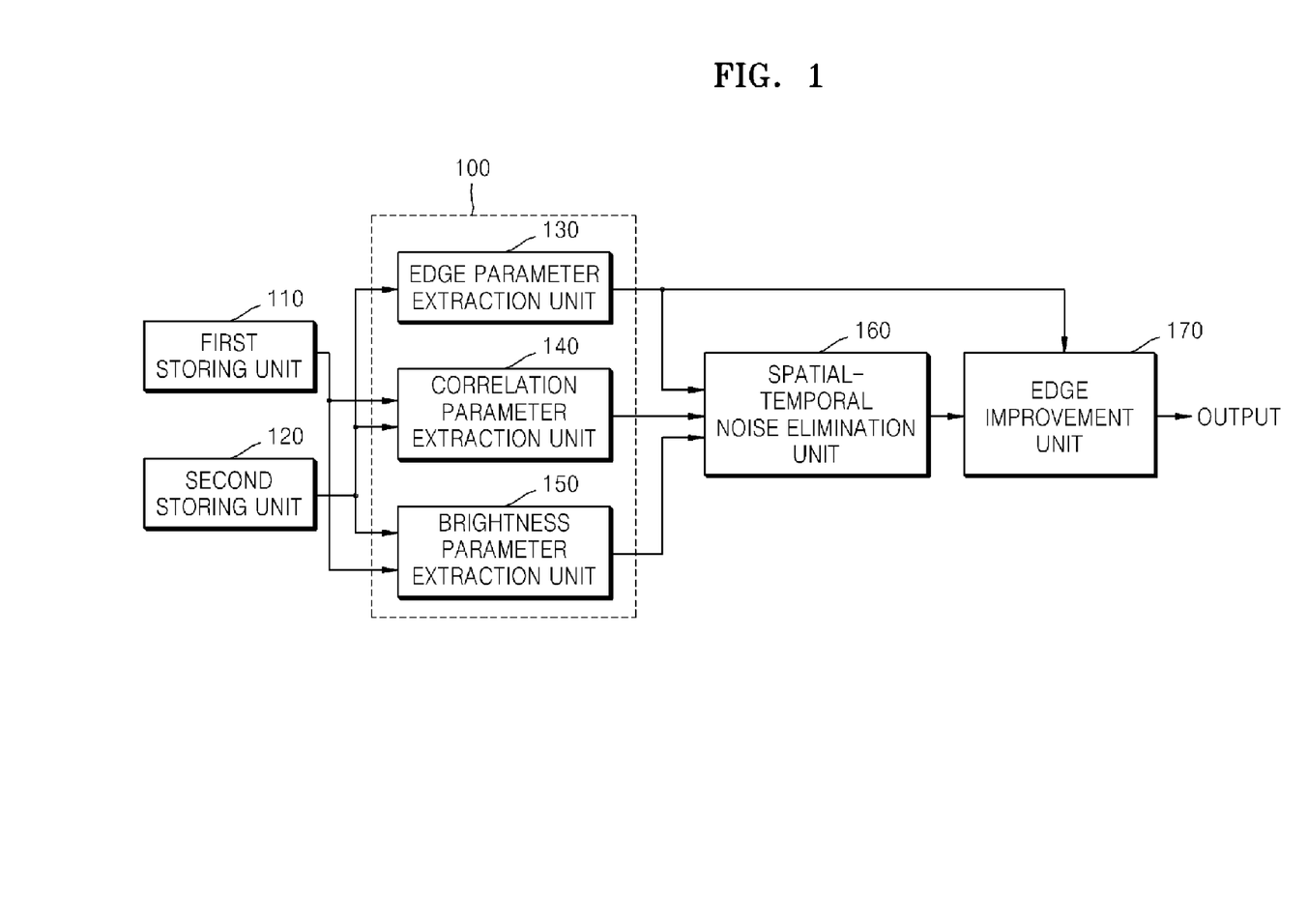
FIG. 1 is a block diagram of an apparatus for eliminating image noise according to an exemplary embodiment of the present invention.

FIG. 1 is a block diagram of an apparatus for eliminating image noise according to an exemplary embodiment of the present invention.

Referring to FIG. 1, the apparatus includes a first storing unit 110, a second storing unit 120, a noise level extraction unit 100, a spatial-temporal noise elimination unit 160, and an edge improvement unit 170. The noise level extraction unit 100 includes an edge parameter extraction unit 130, a correlation parameter extraction unit 140, and a brightness parameter extraction unit 150.

The first storing unit 110 stores an image signal of a previous frame.

The second storing unit 120 stores an image signal of the current frame.

Using spatial-temporal information of neighbor pixels around the current pixel in the current frame and spatial-temporal information of neighbor pixels around the current pixel in the previous frame, the noise level extraction unit 100 extracts a spatial-temporal noise level of the neighbor pixels around the current pixel. The noise level extraction unit 100 extracts an edge parameter, a correlation parameter, and a brightness parameter through the edge parameter extraction unit 130, the correlation parameter extraction unit 140, and the brightness parameter extraction unit 150 and sums up the extracted edge parameter, correlation parameter, and brightness parameter in order to extract the spatial-temporal noise levels.

The edge parameter extraction unit 130 extracts high-frequency components corresponding to an edge portion by performing high-pass filtering on the image signal of the current frame in order to extract an edge intensity around the current pixel in the current frame and applies a function to the extracted high-frequency components, thereby extracting the edge intensity parameter.

The correlation parameter extraction unit 140 extracts a correlation between the image signal of the current frame and the image signal of the previous frame based on a time difference therebetween using two-dimensional (2D) low-pass filtering and applies a function to the extracted correlation, thereby extracting the correlation parameter.

The brightness parameter extraction unit 150 extracts an information change around the current pixel of the current frame and the previous frame over time. In other words, the brightness parameter extraction unit 150 extracts a pixel variation around the current pixels in the current frame and the previous frame using 2D low-pass filtering and applies a function to the pixel change, thereby extracting the brightness parameter.

The spatial-temporal noise elimination unit 160 filters noise in the current pixel of the current frame and the previous frame by applying a weight to spatial-temporal pixels around the current pixels based on the noise level extracted by the noise level extraction unit 100.

The edge improvement unit 170 applies a weight to the noise-filtered pixel obtained by the spatial-temporal noise elimination unit 160 and a boosted-up pixel based on the edge intensity and sums up the weight-applied pixels.

Figure 2:
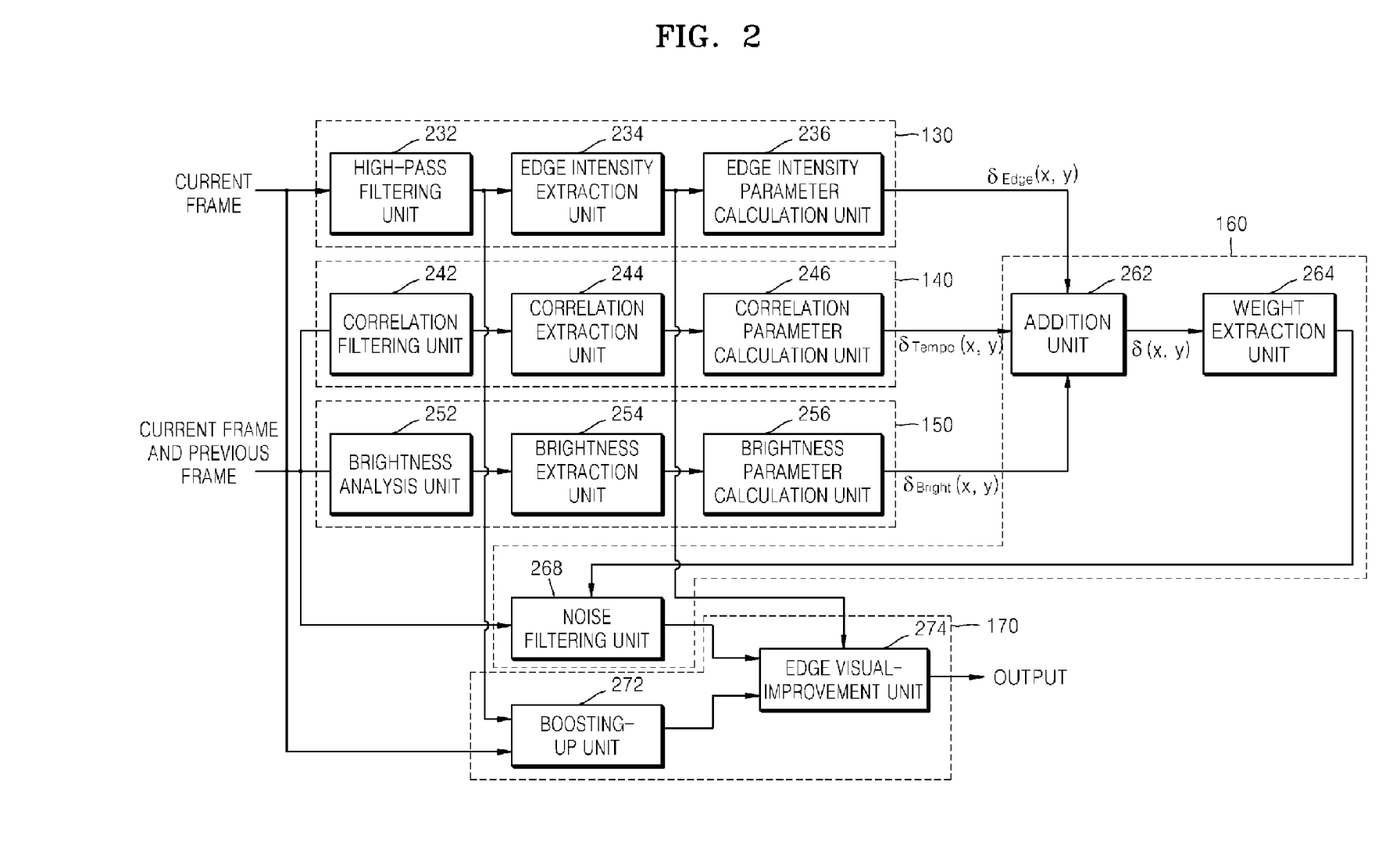
FIG. 2 is a detailed block diagram of the apparatus illustrated in FIG. 1 according to an exemplary embodiment of the present invention.

FIG. 2 is a detailed block diagram of the apparatus illustrated in FIG. 1 according to an exemplary embodiment of the present invention.

Referring to FIG. 2, the edge parameter extraction unit 130 may include a high-pass filtering unit 232, an edge intensity extraction unit 234, and an edge intensity parameter calculation unit 236.

Figure 3:
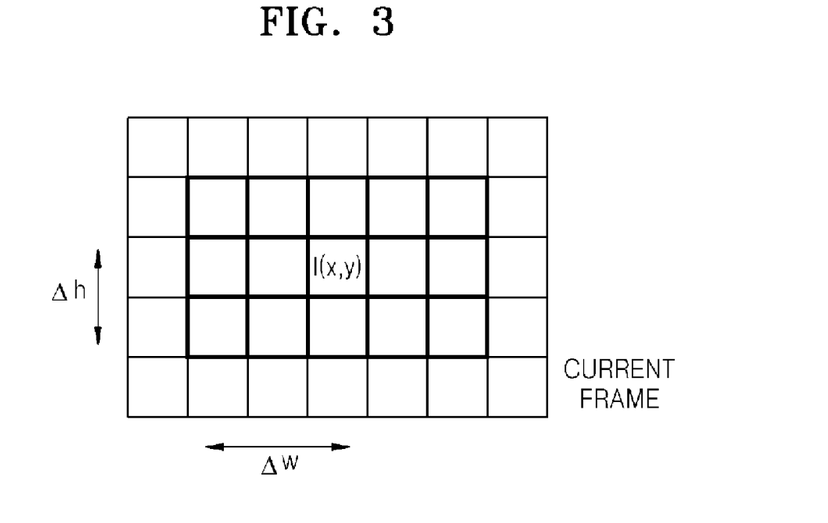
FIG. 3 illustrates a window for filtering of a high-pass filtering unit illustrated in FIG. 2.

The high-pass filtering unit 232 extracts high-pass components corresponding to edge information around the current pixel of the current frame from the image signal of the current frame using 2D high-pass filtering. A window for high-pass filtering is defined by M×N pixels around the current pixel I(x, y), as illustrated in FIG. 3. A filtering coefficient has high-pass characteristics.

A high-pass filtered pixel can be expressed as follows:

$$I_{HPF}(x, y) = \sum_{ij}(F_{ij} \cdot I_{curr}(x - i, y - j)) / \sum_{ij} F_{ij}, \quad (1)$$

where $F_{ij}$ is a filtering coefficient where $i = -\Delta w \sim +\Delta w$ and $j = -\Delta h \sim +\Delta h$, and I(x, y) is a pixel at a predetermined position in a filter.

$F_{ij}$ takes the form of a 2D matrix of M×N pixels and sums to 0.

The edge intensity extraction unit 234 transforms a high-band signal using a mapping function in order to map inputs and outputs between the high-pass filtering unit 232 and the edge intensity parameter calculation unit 236. For example, when the high-pass filtering unit 232 and the edge intensity parameter calculation unit 236 are mapped based on one-to-one correspondence, the mapping function may be Y=X. When a linear or non-linear function is required, an appropriate mapping function may be used. A mapping function between an edge intensity Edge(x, y) and the high-pass filtered pixel $I_{HPF}(x, y)$ can be expressed as follows:

$$\text{Edge}(x, y) = \text{function}(I_{HPF}(x, y)) \quad (2)$$

Figure 4:
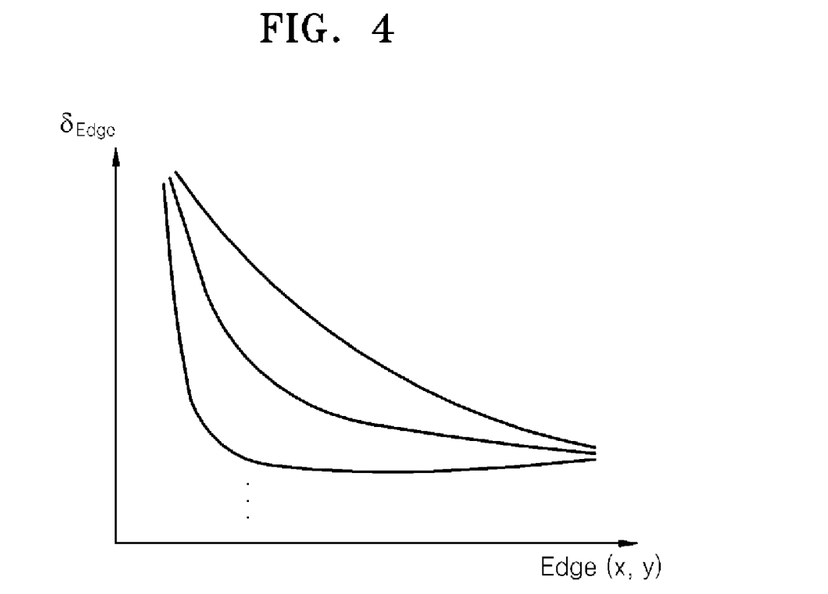
FIG. 4 is a non-linear characteristic graph representing an edge intensity parameter function of FIG. 2.

The edge intensity parameter calculation unit 236 transforms the transformed high-band signal to an edge intensity parameter $\delta_{Edge}(x, y)$ using a function-based equation such as Equation 3 or a look-up table. Since a noise elimination level has to be reduced as the intensity of a spatial edge increases, an edge intensity parameter function is an inversely proportional function as illustrated in FIG. 4. In other words, edge intensity characteristics are mathematically modeled using non-linear characteristics such as an exponential or log as in FIG. 4 or using piecewise line characteristics.

$$\delta_{Edge}(x, y) = \text{function}(\text{Edge}(x, y)) \quad (3)$$

Referring back to FIG. 2, the correlation parameter extraction unit 140 includes a correlation filtering unit 242, a correlation extraction unit 244, and a correlation parameter calculation unit 246.

The correlation filtering unit 242 extracts temporal correlation information using 2D low-pass filtering. The correlation filtering unit 242 obtains a signal difference between frames in order to consider a temporal difference. To this end, the correlation filtering unit 242 obtains a difference between image information of at least two frames that are temporally different from each other and obtains a correlation between a pixel of the current frame and a pixel of another frame that is temporally separated from the current frame.

At this time, various filtering values may be applied, but a filtering value is generally set to a weight based on a Euclidean distance between the pixel of the current frame and the pixel of another frame.

Equation 4 concerns filtering with respect to a temporal correlation between the current frame and the previous frame, i.e., two frames. However, when a plurality of frames are used, a filter coefficient may be extended in Equation 4.

$$I_{DIFF}(x, y) = \sum_{ij}(F_{ij} \cdot (I_{curr}(x - i, y - j) - I_{prev}(x - i, y - j))) / \sum_{ij} F_{ij}, \quad (4)$$

where $F_{ij}$ is a filtering coefficient where $i = -\Delta w \sim +\Delta w$ and $j = -\Delta h \sim +\Delta h$, $I_{curr}(x, y)$ is a pixel of the current frame at a predetermined position in a filter, and $I_{prev}(x, y)$ is a pixel of the previous frame at a predetermined position in the filter.

$F_{ij}$ takes the form of a 2D matrix of M×N pixels and sums to 0.

The correlation extraction unit 244 transforms a difference signal between pixels using a mapping function in order to map inputs and outputs between the correlation filtering unit 242 and the correlation parameter calculation unit 246.

A mapping function between a correlation function Corr(x,y) and the difference signal $I_{DIFF}(x, y)$ can be expressed as follows:

$$\text{Corr}(x, y) = \text{function}(I_{DIFF}(x, y)) \quad (5)$$

The correlation parameter calculation unit 246 transforms the transformed difference signal to a correlation parameter $\delta_{Tempo}(x, y)$ using a function-based equation such as Equation 6 or a look-up table. In other words, the correlation parameter calculation unit 246 can set a relation between a temporal correlation and the correlation parameter using a function.

A function in Equation 6 applies high-level noise elimination for a high temporal correlation and low-level noise elimination for a low temporal correlation, i.e., for a large degree of movement, thereby preserving an edge region.

$$\delta_{Tempo}(x, y) = \text{function}(\text{Corr}(x, y)) \quad (6)$$

Referring back to FIG. 2, the brightness parameter extraction unit 150 includes a brightness analysis unit 252, a brightness extraction unit 254, and a brightness parameter calculation unit 256.

The brightness analysis unit 252 analyzes a brightness signal around the current pixel of the current frame and a brightness signal around the current pixel of the previous frame using 2D low-pass filtering, as in Equation 7.

A filtering coefficient is a low-pass filtering coefficient and may vary with the number of frames. As a temporal difference between the current frame and a frame to be filtered increases, the filtering coefficient decreases due to a Euclidean distance.

$$I_{BRIGHT}(x, y) = \frac{1}{2}\left(\sum_{ij}(F_{ij}^{curr} \cdot I_{curr}(x-i, y-j))\bigg/ \sum_{ij} F_{ij}^{curr} + \sum_{ij}(F_{ij}^{prev} \cdot I_{prev}(x-i, y-j))\bigg/ \sum_{ij} F_{ij}^{prev}\right) \quad (7)$$

where $F_{ij}^{curr}$ and $F_{ij}^{prev}$ are filtering coefficients in the current frame and the previous frame where $i=-\Delta w \sim +\Delta w$ and $j=-\Delta h \sim +\Delta h$, $I_{curr}(x, y)$ is a pixel of the current frame at a predetermined position in a filter, and $I_{prev}(x, y)$ is a pixel of the previous frame at a predetermined position in the filter.

The brightness extraction unit 254 transforms a brightness signal of the neighbor pixels around the pixel in the current frame and the previous frame using a mapping function in order to map inputs and outputs between the brightness analysis unit 252 and the brightness parameter calculation unit 256.

A mapping function between a brightness function Bright(x, y) and the brightness signal $I_{BRIGHT}(x, y)$ can be expressed as follows:

$$\text{Bright}(x, y) = \text{function}(I_{BRIGHT}(x, y)) \quad (8)$$

The brightness parameter calculation unit 256 transforms the brightness signal transformed by the brightness extraction unit 254 to a brightness parameter $\delta_{Bright}(x, y)$ using a function-based equation such as Equation 9 or a look-up table.

$$\delta_{Bright}(x, y) = \text{function}(\text{Bright}(x, y)) \quad (9)$$

Figure 5:
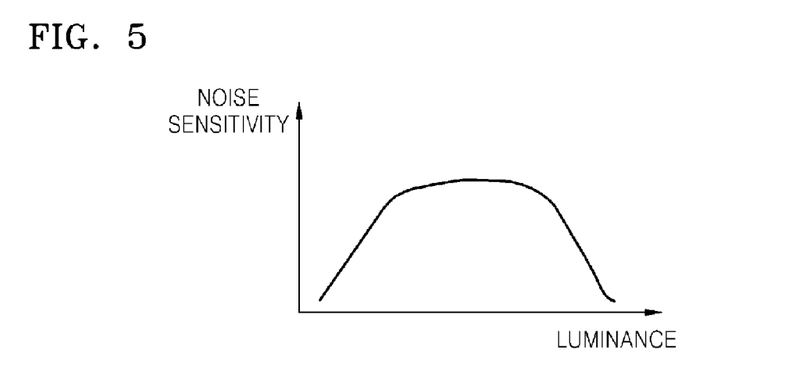
FIG. 5 is a characteristic graph representing a brightness parameter function of FIG. 2.

According to Webers' Law, noise sensitivity increases in an intermediate-brightness region rather than in a region around a bright or dark region. Thus, a function of Equation 9 increases the brightness parameter $\delta_{Bright}(x, y)$ in the intermediate-brightness region. A function in Equation 9 basically has characteristics shown in FIG. 5. Brightness characteristics can be mathematically modeled using non-linear characteristics such as an exponential or log or using piecewise line characteristics.

Referring back to FIG. 2, an addition unit 262 sums up the edge intensity parameter $\delta_{Edge}(x, y)$ obtained by the edge intensity parameter calculation unit 236, the correlation parameter $\delta_{Tempo}(x, y)$ obtained by the correlation parameter calculation unit 246, and the brightness parameter $\delta_{Bright}(x, y)$ obtained by the brightness parameter calculation unit 256, thereby extracting a noise level parameter $\delta(x, y)$, as follows:

$$\delta(x, y) = \delta_{Edge}(x, y) + \delta_{Tempo}(x, y) + \delta_{Bright}(x, y) \quad (10)$$

Equation 10 implies that low-level noise elimination is applied for a small noise level parameter $\delta(x, y)$ that means a region having low spatial-temporal noise level or a very bright or dark region.

The weight extraction unit 264 calculates a weight $w_i(x, y)$ for each of pixels $I_1$ through $I_{30}$ using differences between the pixels $I_1$ through $I_{30}$ and the noise level parameter $\delta(x, y)$.

The weight $w_i(x, y)$ can be modeled as various equations.

Figure 7:
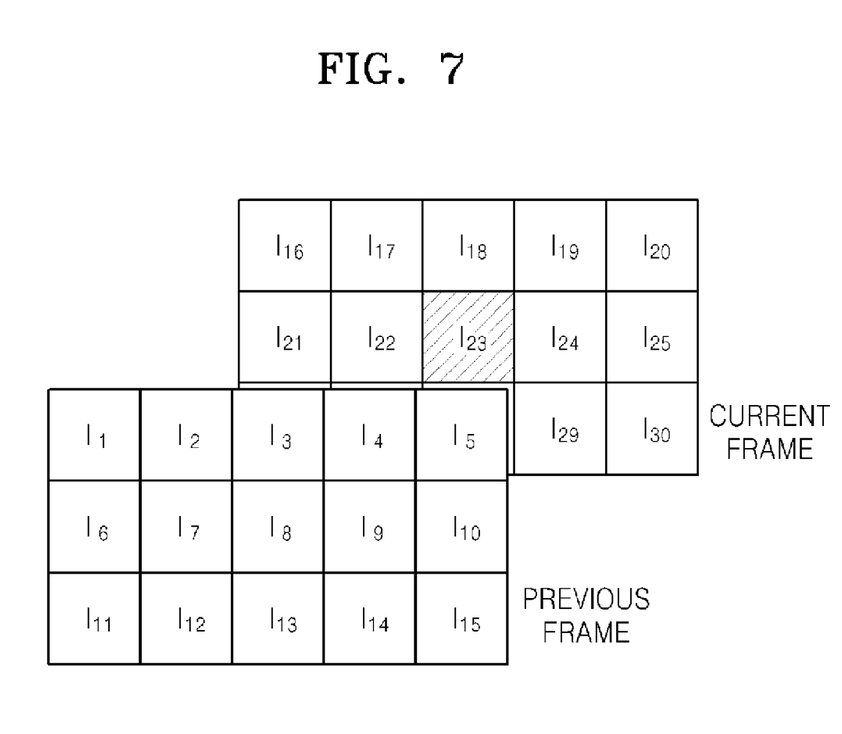
FIG. 7 illustrates a difference in brightness for a weight-averaging function of FIG. 2.

For example, the weight $w_i(x, y)$ may be defined using an exponential function (ex. 1) or a piecewise linear function (ex. 2) as in Equation 11. FIG. 7 illustrates a difference in brightness for a weight-averaging function.

$$\text{Ex 1) } w_i(x, y) = \exp\left(-\frac{I_i - I_{23}}{\delta(x, y)}\right); (i = 1 \sim M \times N) \quad (11)$$

$$\text{Ex 1) } w_i(x, y) = -a_1 \cdot \delta(x, y) \cdot (I_i - I_{23}) + 1 \text{ @Region } A$$
$$w_i(x, y) = -a_2 \cdot \delta(x, y) \cdot (I_i - I_{23}) + 1 \text{ @Region } B$$
$$w_i(x, y) = -a_3 \cdot \delta(x, y) \cdot (I_i - I_{23}) + 1 \text{ @Region } C$$
(piecewise)

Figure 6A:
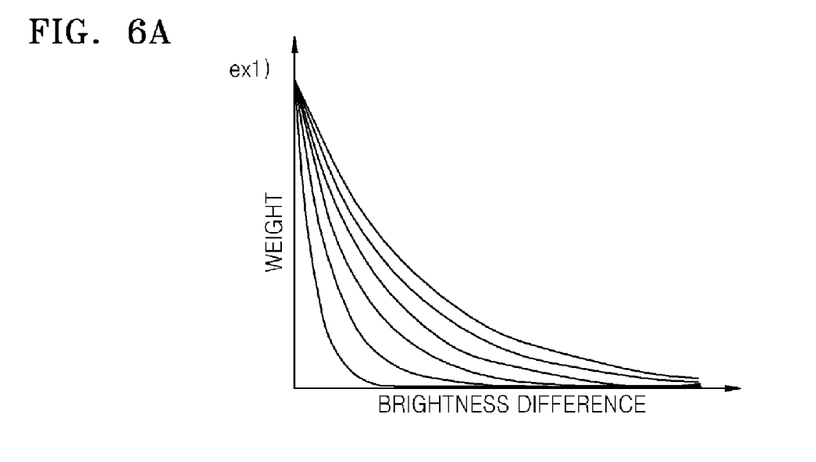
FIGS. 6A and 6B are characteristic graphs representing weight functions of FIG. 2.
Figure 6B:
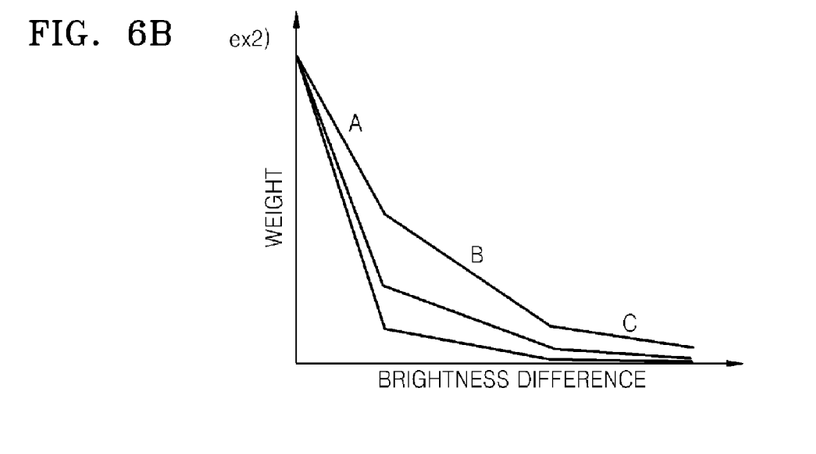

FIGS. 6A and 6B are characteristic graphs representing a weight function modeled using an exponential function and a weight function modeled using a piecewise linear function. In FIGS. 6A and 6B, an x axis indicates a brightness difference between the current pixel $I_{23}$ and its spatial-temporal neighbor pixels $I_1$ through $I_{30}$ and a y axis indicates a weight $w_i(x,y)$.

A noise filtering unit 268 obtains a weight average for the neighbor pixels around the current pixels in the current frame and the previous frame based on (M×N−1) weights $w_i(x, y)$ extracted by the weight extraction unit 264 and replaces the current pixel $I_{23}$ with the weight average, thereby obtaining a noise-eliminated pixel. FIG. 7 illustrates a difference in brightness for a weight-averaging function.

The noise filtering unit 268 can obtain the noise-eliminated pixel $I_{Denoise}(x,y)$ using the weight-averaging function, as follows:

$$I_{Denoise}(x, y) = \frac{\sum_{i=1}^{M \times N}(w_i(x, y) \cdot I_t(x, y))}{\sum_{i=1}^{M \times N} w_i(x, y)} \quad (12)$$

A boosting-up unit 272 boosts up a pixel of the image signal of the current frame using high-pass filtering.

The boosted-up pixel may be expressed as follows:

$$I_{Boost-up}(x, y) = I_{curr}(x, y) + I_{HPF}(x, y) \quad (13)$$

An edge visual-improvement unit 274 adjusts a weight corresponding to an edge intensity for each of the noise-eliminated pixel obtained by the noise filtering unit 268 and the boosted-up pixel obtained by the boosting-up unit 272, thereby outputting an image having a visually improved edge. The weights use the edge intensity extracted by the edge intensity extraction unit 234.

A final pixel $I_{Final}(x, y)$ to which the weight is applied can be expressed as follows:

$$I_{Final}(x, y) = \text{Weight} \cdot I_{Denoise}(x, y) + (1 - \text{Weight}) \cdot I_{Boost-up}(x, y) \quad (14)$$

Thus, a higher weight is applied to the boosted-up pixel than the noise-eliminated pixel in an edge region having high edge intensity to preserve the edge region and a higher weight is applied to the noise-eliminated pixel than the boosted-up pixel in a flat region having low edge intensity to raise a noise elimination level.

At this time, the weight can be expressed as a function of the edge intensity, as follows:

$$\text{Weight} = \text{function}(\text{Edge}(x, y)) \quad (15)$$

The present invention can be embodied as code that is readable by a computer, including a device having an information processing function, on a computer-readable recording medium. The computer-readable recording medium includes all kinds of recording devices storing data that is readable by a computer system. Examples of the computer-readable recording medium include read-only memory (ROM), random access memory (RAM), CD-ROMs, magnetic tapes, floppy disks, and optical data storage devices. The computer readable recording medium can also be distributed over network coupled computer systems so that the computer readable code is stored and executed in a distributed fashion.

As described above, according to the present invention, spatial-temporal noise elimination can be performed by taking account of spatial edge components, temporal change components, and spatial-temporal brightness changes. In other words, it is possible to suppress the generation of noise in a visually-sensitive intermediate gray level by using a visual model, reduce an influence of noise introduced in a visually-sensitive edge region, and eliminate noise generated in a visually-insensitive region at a high noise elimination level. Therefore, the present invention can be applied to camcorders, digital cameras, optical recording/reproducing apparatuses, portable multimedia devices, digital TVs, projection devices, and the like.

While the present invention has been particularly shown and described with reference to an exemplary embodiment thereof, it will be understood by those of ordinary skill in the art that various changes in form and detail may be made therein without departing from the spirit and scope of the present invention as defined by the following claims.

What is claimed is:

1. A method of eliminating image noise, the method comprising:
    extracting a spatial-temporal noise level of neighbor pixels around a current pixel of a current frame, wherein the extracting the spatial-temporal noise level comprises extracting a spatial edge intensity parameter, a temporal correlation parameter and a spatial-temporal brightness parameter, and generating the spatial-temporal noise level as a summation of the spatial edge intensity parameter, the temporal correlation parameter and the spatial-temporal brightness parameter;
    filtering noise of the current pixel by applying a weight to spatial-temporal pixels around the current pixel based on the extracted spatial-temporal noise level; and
    applying a weight to the noise-filtered current pixel and to a boosted-up pixel based on an edge intensity, and summing up the weight-applied pixels.

2. The method of claim 1, wherein the spatial-temporal noise level is extracted based on spatial-temporal information of the neighbor pixels around the current pixel in the current frame and spatial-temporal information of neighbor pixels around a corresponding pixel in a previous frame.

3. The method of claim 1, wherein the spatial-temporal noise level is extracted based on a spatial edge intensity of an image, a temporal correlation between the neighbor pixels in the current frame and neighbor pixels around a corresponding pixel in a previous frame, and a change in spatial-temporal brightness of the neighbor pixels in the current frame and the neighbor pixels in the previous frame.

4. The method of claim 1, wherein the extracting the spatial-temporal noise level comprises:
    extracting a spatial edge intensity of an image, a temporal correlation between the neighbor pixels in the current frame and neighbor pixels around a corresponding pixel in a previous frame, and a spatial-temporal brightness of the neighbor pixels in the current frame and the neighbor pixels in the previous frame; and
    transforming the spatial edge intensity, the temporal correlation, and the spatial-temporal brightness to the spatial edge intensity parameter, the temporal correlation parameter and the spatial-temporal brightness parameter using function-based equations.

5. The method of claim 4, wherein the extracting the spatial edge intensity comprises:
    performing high-pass filtering on an image signal of the current frame in order to extract an edge intensity;
    transforming the high-pass filtered signal using a function; and
    transforming the transformed signal to the spatial edge intensity parameter using a function-based equation.

6. The method of claim 4, wherein the extracting the temporal correlation comprises:
    extracting a difference between the neighbor pixels around the current pixel in the current frame and the neighbor pixels around the corresponding pixel in the previous frame;
    transforming the difference using a function; and
    transforming the transformed difference to the temporal correlation parameter using a function-based equation.

7. The method of claim 4, wherein the extracting the spatial-temporal brightness comprises:
    extracting a pixel change around the current pixel in the current frame and the corresponding pixel in the previous frame;
    transforming the pixel change using a function; and
    transforming the transformed pixel change to the spatial-temporal brightness parameter using a function-based equation.

8. The method of claim 4, wherein the filtering of the noise comprises:
    summing the spatial edge intensity parameter, the temporal correlation parameter, and the spatial-temporal brightness parameter;
    calculating weights for the current pixel and its neighbor pixels based on a result of the summing and a difference between the current pixel and its neighbor pixels;
    calculating weights for the corresponding pixel and its neighbor pixels based on the result of the summing and a difference between the corresponding pixel and its neighbor pixels; and
    calculating a weight average for the neighbor pixels around the current pixel in the current frame and the neighbor pixels around the corresponding pixel in the previous frame based on the calculated weights and replacing the current pixel with the weight average.

9. The method of claim 1, wherein the applying the weight based on the edge intensity comprises:
    boosting up a pixel of an image signal of the current frame; and
    applying the weight to the noise-filtered pixel and the boosted-up pixel based on the edge intensity, and summing the weight-applied pixels.

10. The method of claim 9, wherein the weight based on the edge intensity is a parameter determined by an output of a function that receives the edge intensity.

11. An image processing apparatus comprising:
    a noise level extraction unit which extracts a spatial-temporal noise level of neighbor pixels around a pixel based on spatial-temporal information of neighbor pixels around a current pixel in a current frame and spatial-temporal information of neighbor pixels around a corresponding pixel in a previous frame, wherein the noise level extraction unit extracts the spatial-temporal noise level by extracting a spatial edge intensity parameter, a temporal correlation parameter and a spatial-temporal brightness parameter, and generating the spatial-temporal noise level as a summation of the edge intensity parameter, the temporal correlation parameter and the spatial-temporal brightness parameter;

a spatial-temporal noise elimination unit which filters noise of the current pixel by applying a weight to spatial-temporal pixels around the current pixel based on the spatial-temporal noise level extracted by the noise level extraction unit; and an edge improvement unit which applies a weight to the noise-filtered current pixel obtained by the spatial-temporal noise elimination unit and to a boosted-up pixel based on an edge intensity and sums the weight-applied pixels, wherein at least one of the noise level extraction unit, the spatial-temporal noise elimination unit and the edge improvement unit is a hardware component.

12. The image processing apparatus of claim 11, wherein the noise level extraction unit comprises:

an edge intensity parameter extraction unit which generates the spatial edge intensity parameter by extracting the edge intensity by performing high-pass filtering on an image signal of the current frame;

a correlation parameter extraction unit which generates the temporal correlation parameter by extracting a difference between the neighbor pixels around the current pixel in the current frame and the neighbor pixels around the corresponding pixel in the previous frame; and a brightness parameter extraction unit which generates a brightness parameter by extracting a pixel change around the current pixel in the current frame and the corresponding pixel in the previous frame.

13. The image processing apparatus of claim 12, wherein the spatial-temporal noise elimination unit comprises:

an addition unit which sums the spatial edge intensity parameter, the temporal correlation parameter, and the spatial-temporal brightness parameter;

a weight extraction unit which extracts weights for the current pixel and its neighbor pixels based on a summing result of the addition unit and a difference between the current pixel and its neighbor pixels, and extracts weights for the corresponding pixel and its neighbor pixels based on the summing result of the addition unit and a difference between the corresponding pixel and its neighbor pixels; and a noise filtering unit which calculates a weight average for the neighbor pixels around the current pixel in the current frame and the neighbor pixels around the corresponding pixel in the previous frame based on the calculated weights and replaces the current pixel with the weight average.

14. The image processing apparatus of claim 11, wherein the edge improvement unit comprises:

a boosting-up unit which boosts up a pixel of an image signal of the current frame; and an edge visual-improvement unit which applies the weight to the noise-filtered pixel and the boosted-up pixel based on the edge intensity and sums the weight-applied pixels.

15. The method of claim 1, wherein the extracting the spatial-temporal noise level comprises extracting the spatial edge intensity parameter using a spatial edge intensity of an image, extracting the temporal correlation parameter using a temporal correlation between the current frame and a previous frame, and extracting the spatial-temporal brightness parameter using a spatial-temporal brightness of the neighbor pixels around the current pixel and the neighbor pixels around a corresponding pixel in the previous frame.

16. The image processing apparatus of claim 11, the noise level extraction unit extracts the spatial-temporal noise level by extracting the spatial edge intensity parameter using a spatial edge intensity of an image, extracting the temporal correlation parameter using a temporal correlation between the current frame and a previous frame, and extracting the spatial-temporal brightness parameter using a spatial-temporal brightness of the neighbor pixels around the current pixel and the neighbor pixels around a corresponding pixel in the previous frame.

17. The method of claim 1, wherein the weight applied to the spatial-temporal pixels around the current pixel is inversely proportional to the extracted spatial-temporal noise level.

18. The image processing apparatus of claim 11, wherein the weight applied to the spatial-temporal pixels around the current pixel is inversely proportional to the extracted spatial-temporal noise level.

19. A method of eliminating image noise, the method comprising:

extracting a spatial-temporal noise level of neighbor pixels around a current pixel of a current frame;

filtering noise of the current pixel by applying a weight to spatial-temporal pixels around the current pixel based on the extracted spatial-temporal noise level; and applying a weight to the noise-filtered current pixel and to a boosted-up pixel based on an edge intensity, and summing up the weight-applied pixels, wherein the extracting the spatial-temporal noise level comprises:

extracting a spatial edge intensity of an image, a temporal correlation between the neighbor pixels, and a spatial-temporal brightness of the neighbor pixels; and transforming the spatial edge intensity, the temporal correlation, and the spatial-temporal brightness to parameters using function-based equations, and wherein the filtering of the noise comprises:

summing the spatial edge intensity parameter, the temporal correlation parameter, and the spatial-temporal brightness parameter;

calculating weights for the current pixel and its neighbor pixels based on a result of the summing and a difference between the current pixel and its neighbor pixels;

calculating weights for the corresponding pixel and its neighbor pixels based on the result of the summing and a difference between the corresponding pixel and its neighbor pixels; and calculating a weight average for the neighbor pixels around the current pixel in the current frame and the neighbor pixels around the corresponding pixel in the previous frame based on the calculated weights and replacing the current pixel with the weight average.

20. An image processing apparatus comprising:

a noise level extraction unit which extracts a spatial-temporal noise level of neighbor pixels around a pixel based on spatial-temporal information of neighbor pixels around a current pixel in a current frame and spatial-temporal information of neighbor pixels around a corresponding pixel in a previous frame;

a spatial-temporal noise elimination unit which filters noise of the current pixel by applying a weight to spatial-temporal pixels around the current pixel based on the spatial-temporal noise level extracted by the noise level extraction unit; and an edge improvement unit which applies a weight to the noise-filtered current pixel obtained by the spatial-temporal noise elimination unit and to a boosted-up pixel based on an edge intensity and sums the weight-applied pixels, wherein at least one of the noise level extraction unit, the spatial-temporal noise elimination unit and the edge improvement unit is a hardware component, wherein the noise level extraction unit comprises:

an edge intensity parameter extraction unit which generates an edge intensity parameter by extracting the edge intensity by performing high-pass filtering on an image signal of the current frame;

a correlation parameter extraction unit which generates a correlation parameter by extracting a difference between neighbor pixels around the current pixel in the current frame and neighbor pixels around the corresponding pixel in the previous frame; and a brightness parameter extraction unit which generates a brightness parameter by extracting a pixel change around the current pixel in the current frame and the corresponding pixel in the previous frame, and wherein the spatial-temporal noise elimination unit comprises:

an addition unit which sums the edge intensity parameter, the correlation parameter, and the brightness parameter;

a weight extraction unit which extracts weights for the current pixel and its neighbor pixels based on a summing result of the addition unit and a difference between the current pixel and its neighbor pixels, and extracts weights for the corresponding pixel and its neighbor pixels based on the summing result of the addition unit and a difference between the corresponding pixel and its neighbor pixels; and a noise filtering unit which calculates a weight average for the neighbor pixels around the current pixel in the current frame and the neighbor pixels around the corresponding pixel in the previous frame based on the calculated weights and replaces the current pixel with the weight average.

* * * * *